W. B. TODD.
Devices to Prevent Calves from Sucking
No. 148,631.          Patented March 17, 1874.
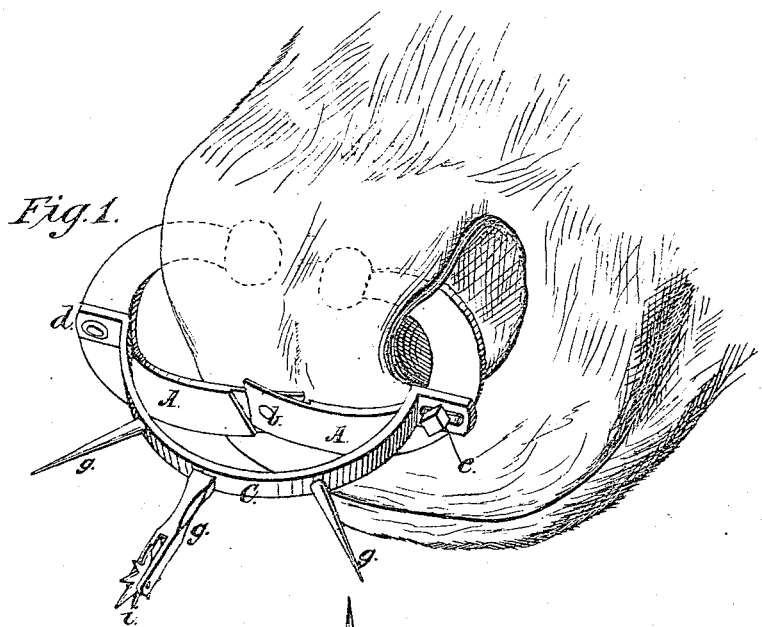
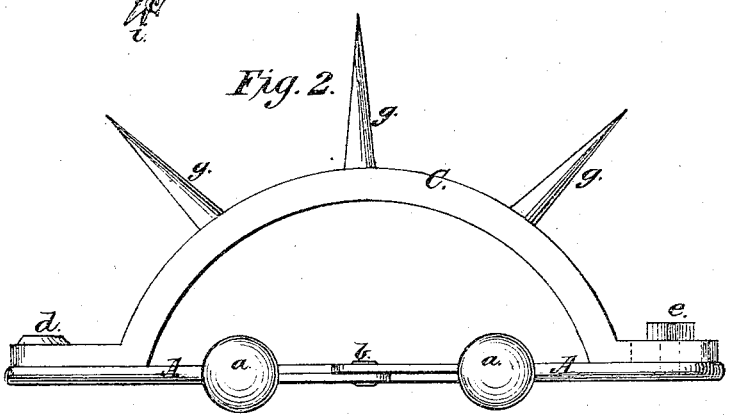
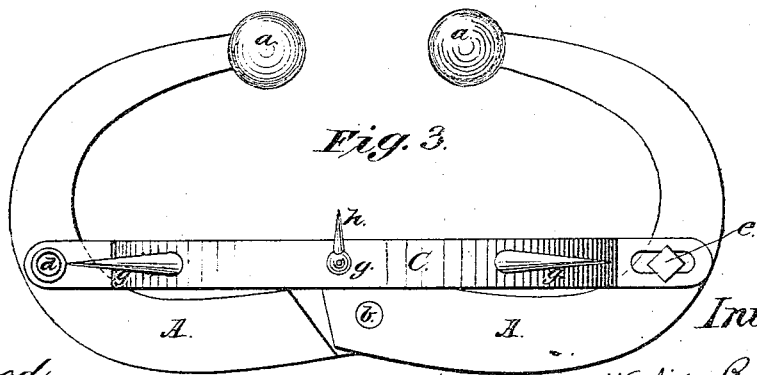
Attest,
M. P. Harwood
John A. Ellis
Inventor,
Warfield B. Todd

UNITED STATES PATENT OFFICE.

WARFIELD B. TODD, OF LA FAYETTE, ILLINOIS.

IMPROVEMENT IN DEVICES TO PREVENT CALVES FROM SUCKING.

Specification forming part of Letters Patent No. 148,631, dated March 17, 1874; application filed December 24, 1873.

*To all whom it may concern:*

Be it known that I, WARFIELD B. TODD, of La Fayette, in the county of Stark and State of Illinois, have invented a new and useful Improvement in Device to Prevent Calves from Sucking; and I do hereby declare the following to be a full, clear, and exact description of the same, reference being had to the accompanying drawings, in which—

Figure 1 is a perspective view, showing the mode of applying my improvement. Fig. 2 is an elevation, and Fig. 3 is a plan, of the same.

This invention relates to that class of devices designed to prevent a cow from sucking herself or permitting her calf from sucking; and it consists of a jointed frame the ends of which are to be inserted into the nostril, said frame being armed with spikes or spurs and an adjusting-bar, whereby the said frame may be readily adjusted and securely held in place.

Heretofore, devices for this purpose have not been constructed so as to be securely held in position. They have been rigid, so that they could not grasp the septum of the nostril with certainty, or they have been kept in place only by a spring, which, by its constant pressure, is unnecessarily irritating to the nostril and uncertain in its action. My improvement permits the device to be put in place with ease, and then the parts securely held so that they cannot be removed.

That others may fully understand my improvement, I will particularly describe it.

A A are two curved U-shaped bars, each terminated at one end with a small ball, $a$, and at the other fitted so that the two may be jointed together, as at $b$. A bar, C, either arched or straight, is secured at one end to one of the bars A by a pivot-bolt, as at $d$, and at the other end it is attached to the other bar A by an adjustable connection, which may be rigidly fixed so as to hold the bars A A in any desired relative position. I prefer to employ for this purpose a slot and set-screw, $e$, as being more convenient, but not otherwise preferable to other well-known methods of accomplishing the desired end. The bar C is armed with spikes or spurs $g$, so that when the calf is provided with this device the cow will not suffer it to approach her. The central spike may be provided with a lateral spur, $h$, or with a revolving spur, $i$, so that if the calf attempts to throw the contrivance upward to rest against his face the said lateral spurs will prick him.

I claim—

1. In combination with the curved and jointed bar A A, the adjusting-bar C, carrying the spikes $g$ $g$, to hold the parts of said bar rigidly in position, as described.

2. In combination with the bar A and spike $g$, the lateral spur $h$ or revolving spur $i$, for the purpose set forth.

WARFIELD B. TODD.

Witnesses:
H. R. HALSEY,
D. J. HURD.